United States Patent
Succop

(10) Patent No.: US 7,185,662 B2
(45) Date of Patent: Mar. 6, 2007

(54) METHODS OF PREPARING, CLEANING AND REPAIRING ARTICLE AND ARTICLE REPAIRED

(75) Inventor: John Shearer Succop, East Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/714,293

(22) Filed: Nov. 14, 2003

(65) Prior Publication Data

US 2005/0139235 A1 Jun. 30, 2005

(51) Int. Cl.
*B08B 9/093* (2006.01)
(52) U.S. Cl. .................. 134/22.1; 134/22.18; 134/1
(58) Field of Classification Search .............. 134/22.1, 134/22.18, 8, 1
See application file for complete search history.

(56) References Cited

U.S. PATENT DOCUMENTS

| | | | | |
|---|---|---|---|---|
| 4,456,428 A | * | 6/1984 | Cuvillier | 416/97 R |
| 4,604,031 A | * | 8/1986 | Moss et al. | 416/97 R |
| 4,820,122 A | * | 4/1989 | Hall et al. | 416/97 R |
| 5,679,174 A | * | 10/1997 | Buongiorno | 134/22.18 |
| 2002/0076097 A1 | | 6/2002 | Vaidyanathan | |
| 2002/0090298 A1 | * | 7/2002 | Beeck et al. | 416/97 R |

FOREIGN PATENT DOCUMENTS

DE 198 01 804 A 1 7/1999

OTHER PUBLICATIONS

European Search Report dated Aug. 30, 2005.

* cited by examiner

*Primary Examiner*—Michael Barr
*Assistant Examiner*—Saeed Chaudhry
(74) *Attorney, Agent, or Firm*—Tracey R. Loughlin

(57) ABSTRACT

A cleaning preparation method, comprising: providing a part with an internal cavity, an opening, and foreign material within the cavity; and creating an additional opening in the part adjacent the foreign material. A cleaning method, comprising: providing a part with an internal cavity and an opening; creating an additional opening in the part; and flushing the cavity with a fluid. The additional opening acts as an exit or entrance for the fluid. A repair method, comprising: providing a part with an internal cavity, an opening and foreign material within the cavity; creating an additional opening in the part; and removing the foreign material through the additional opening. A part, comprising: an exterior surface; an internal cavity; an opening through the surface to the cavity; and a repaired section of the surface, which was an additional opening that provided a temporary exit or entrance to the cavity for foreign material removal.

23 Claims, 5 Drawing Sheets

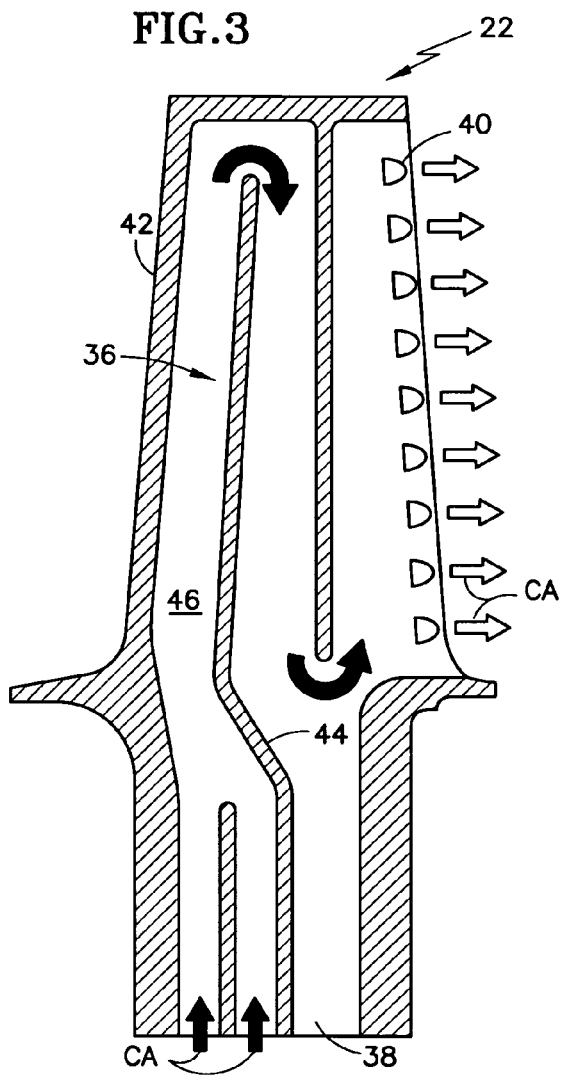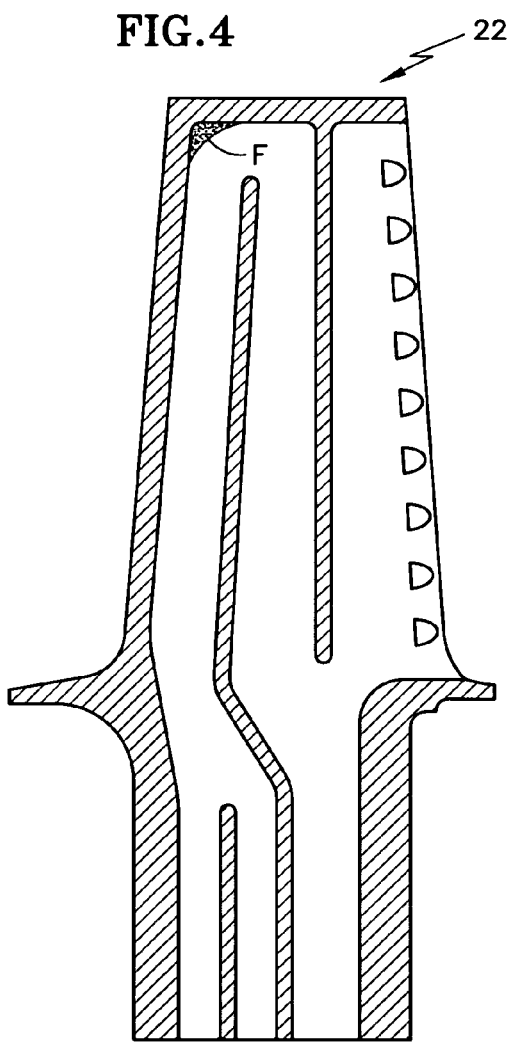

METHODS OF PREPARING, CLEANING AND REPAIRING ARTICLE AND ARTICLE REPAIRED

BACKGROUND OF THE INVENTION

This invention relates to methods of preparing, cleaning and repairing an article an the repaired article.

BRIEF SUMMARY OF THE INVENTION

It is an object of the present invention to provide a method of preparing an article for cleaning.

It is a further object of the present invention to provide a method of cleaning an article.

It is a further object of the present invention to provide a method of repairing an article.

It is a further object of the present invention to provide a repaired article.

These and other objects of the present invention are achieved in one aspect by a method of preparing a part for cleaning, comprising the steps of: providing a part with an internal cavity, at least one opening in communication with the cavity, and foreign material within the cavity; and creating an additional opening in the part at a location adjacent the foreign material.

These and other objects of the present invention are achieved in another aspect by method of cleaning a part, comprising the steps of: providing a part with an internal cavity, at least one opening in communication with the cavity; creating an additional opening in the part; and flushing the cavity with a fluid. The additional opening acts as an exit or entrance for the fluid.

These and other objects of the present invention are achieved in another aspect by a method of repairing a part, comprising the steps of: providing a part with an internal cavity, at least one opening in communication with the cavity, and foreign material within the cavity; creating an additional opening in the part; and removing the foreign material. The removing step occurs through the additional opening.

These and other objects of the present invention are achieved in another aspect a part, comprising: an exterior surface; an internal cavity; at least one opening through the surface and in communication with the cavity; and a repaired section of the surface. The repaired section was an additional opening that provided a temporary exit or entrance to the cavity for removing foreign material from the cavity.

BRIEF DESCRIPTION OF THE DRAWINGS

Other uses and advantages of the present invention will become apparent to those skilled in the art upon reference to the specification and the drawings, in which:

FIG. 3 is a cross-sectional view of the turbine blade of FIG. 2;

FIG. 4 is the turbine blade of FIG. 3 showing the presence of foreign material therein;

DETAILED DESCRIPTION OF THE INVENTION

Figure 1:
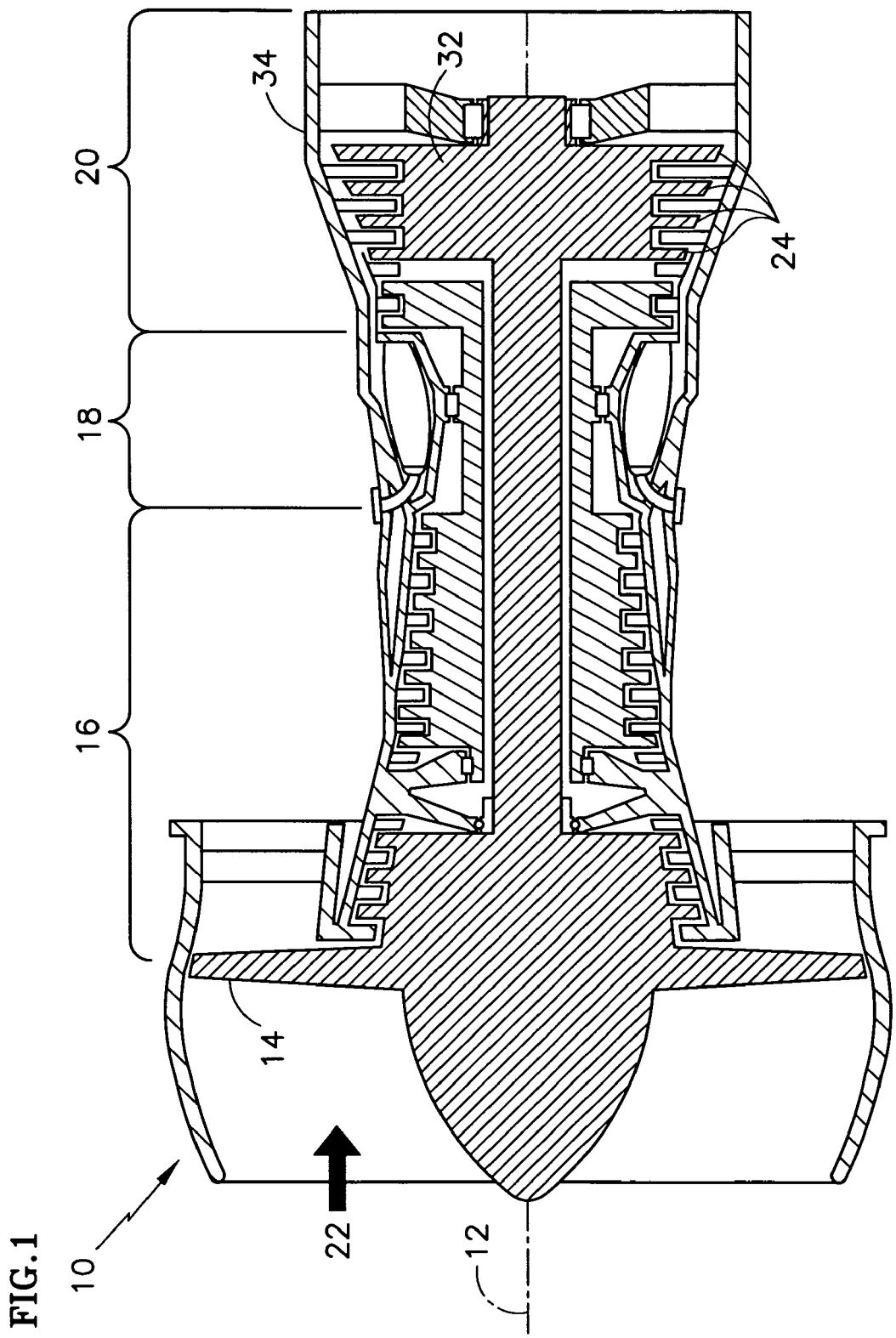
FIG. 1 is a cross-sectional view of a gas turbine engine.

FIG. 1 displays a gas turbine engine 10 used, for example, for propulsion or power generation. Along an axial centerline 12 in the downstream direction, the engine 10 includes a fan section 14, a compressor section 16, a burner section 18 and a turbine section 20.

The fan section 14 draws air 22 into the engine 10. A portion of the air 22 drawn in by the fan section 14 travels into the compressor 16 (i.e. "core engine flow"), while the remainder (i.e. "bypass flow") does not. The core engine flow becomes compressed traveling through the compressor section 16, then mixes with fuel supplied by fuel injectors in the burner section 18. Within the burner section 18, the air/fuel mixture combusts. The combustion gases exit the burner section 18 and enter the turbine section 20. The combustion gases drive the turbine section 18.

Figure 2:
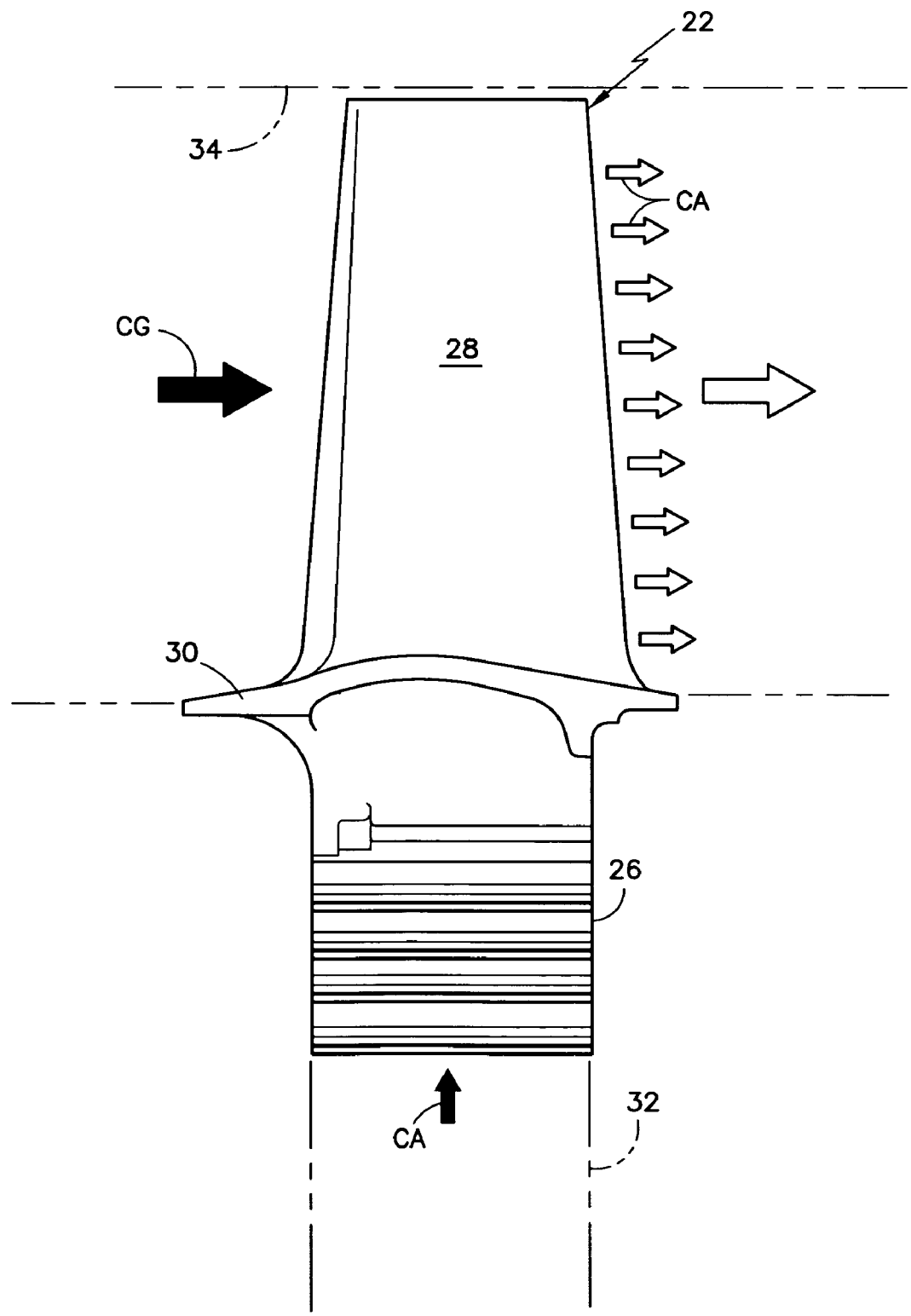
FIG. 2 is an elevational view of a turbine blade used in the engine of FIG. 1.

FIG. 2 displays a portion of the turbine section 20. Specifically, the figure displays a turbine blade 22 with a root section 26 and an airfoil section 28 separated by a platform 30. The root section 26 secures to a correspondingly shaped feature on a rotor 32 (shown in phantom). Since the platform 30, in combination with other features of the engine 10, defines the radially inner boundary of the core gas path, the airfoil section 28 resides within the core gas path. The engine case 34 (shown in phantom) defines the radially outer boundary of the core gas path. During operation, the rotor 32 and turbine blades 22 spin as a result of the combustion gases CG exiting the burner section 18.

So the turbine section 20, particularly the airfoil section 28 of the turbine blades 28, can endure prolonged exposure to the high temperature of the combustion gases CG, the engine 10 introduces cooling air to the turbine section 20. Typically, the engine 10 draws such cooling air from the compressor section 16. One path for introducing cooling air to the turbine section 20 is through the turbine blades 22. As explained in more detail below, the turbine blade 22 is hollow so as to receive cooling air CA.

FIG. 3 displays a cross-sectional view of the turbine blade 22. The turbine blade 22 has an internal cavity 36. The cavity 36 includes one or more openings, such as one or more inlets 38 and one or more outlets 40. In addition to the exterior surface 42, the turbine blade 22 could include one or more internal walls 44 arranged to form a serpentine passageway 46 between the inlets 38 and outlets 40. The cooling air CA can enter the internal cavity 36 through the inlets 38, travel along the passageway 46, then exit the outlets 40. Although shown in the figure as disposed along the trailing edge, the outlets 40 could reside anywhere on the airfoil section 28 and in any desired arrangement.

As seen in FIG. 4, foreign material F can become trapped within the cavity 36. Various causes can introduce the foreign material F to the cavity 36. For instance, harsh operating conditions can introduce the foreign material F (e.g. sand) into the engine 10. In addition, maintenance operations (e.g. coating removal) can introduce the foreign material F to the cavity 36. In fact, the manufacturing process that produces the turbine blade 22 could introduce the foreign material F. Although shown at one specific location within the cavity 36, the foreign material F could reside at any location within the cavity 36.

The presence of the foreign material F within the cavity 36 can reduce the effectiveness of the cooling air CA. Unless successful removal of the foreign material F occurs, the turbine blade 22 will likely not return to service (i.e. scrapped). Scrapping a turbine blade 22 can be costly. Removal of the foreign material F from the cavity 36 can prove difficult for several reasons. First, the operation of the engine 22 with the foreign material F present, the performance of maintenance operations and the manufacturing processes tend to sinter the foreign material F in place. Second, the typical size of the inlets 38 and outlets 40 and the shape of the serpentine passageway 46 make access to the foreign material F difficult.

The following describes the steps in one possible method of refurbishing the turbine blade 22 by removing the foreign material F. Although described with specific reference to a turbine blade, the methods described herein have applicability with any part having an internal cavity that may contain foreign material F. These parts could be other parts of the engine 10, such as turbine vanes, or parts unrelated to gas turbine engines.

One step in a possible method of removing the foreign material F is to locate the foreign material F within the cavity 36. Depending on the position of the foreign material F within the serpentine passageway 46, various techniques are available to locate the foreign material. For example, the technician may visually identify the location of the foreign material F. Most likely, however, the technician would need to rely on suitable machines to locate the foreign material F. For instance, the technician could use x-ray, neutron radiography, ultrasound and thermal imaging to locate the foreign material F.

Figure 5:
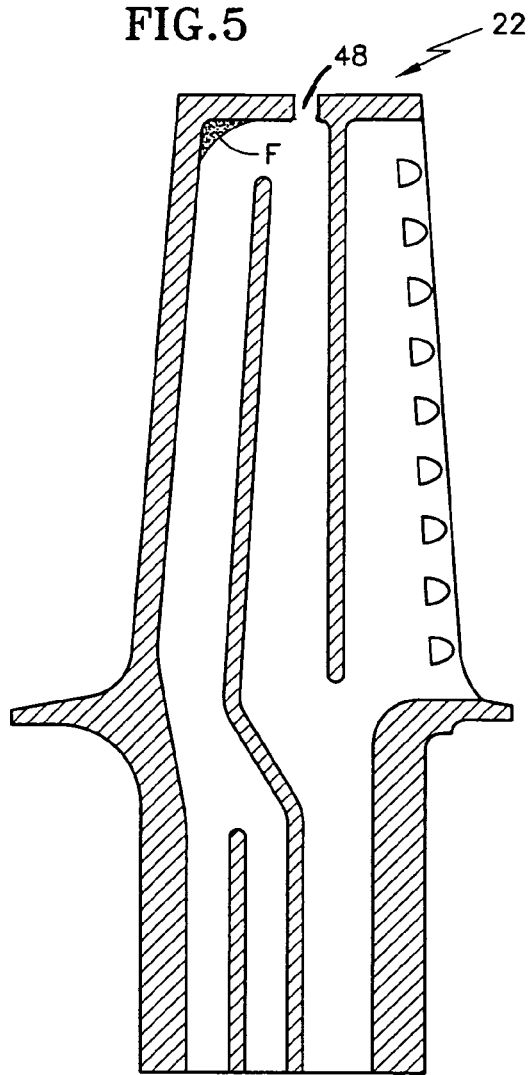
FIG. 5 is the turbine blade of FIG. 3 after a step in one possible method of removing the foreign material.

Another step in a possible method of removing the foreign material F is to create another opening in the turbine blade 22. FIG. 5 shows the turbine blade 22 with an additional opening 48 in communication with the cavity 36. The technician could rely on any suitable technique to create the additional opening 48 in the turbine blade 22. For example, a technician could utilize a router, milling machines, electrical discharge machining (EDM) or laser drilling to create the additional opening 48. As seen in the figure, the additional opening 48 could have the shape of a channel on the tip of the turbine blade 22, transversing the turbine blade 22 from a concave side to a convex side of the airfoil section 28, but other shapes are possible. The figure also shows the opening 48 extending in the radial direction, but other orientations (e.g. angled relative to the radial direction) are possible.

Furthermore, the additional opening 48 could have any suitable position on the turbine blade 22. The position of the additional opening 48 could be selected relative to the location of the foreign material F and to the specific techniques used in later method steps. Generally speaking, one suitable location for the additional opening 48 is radially outboard of the foreign material F and as close to the foreign material F as possible. As seen in the figure, the additional opening 48 is downstream of the foreign material F.

Performing the locating step is not mandatory. Without the locating step, the technician does not know the exact location of foreign material or if foreign material even resides within the cavity 36. In this instance, one suitable location for the additional opening 48 is adjacent an expected location of the foreign material F, determined either by prior experience or estimation. After adding the additional opening 48, preparation of the turbine blade 22 has occurred. The turbine blade 22 can proceed to another step in a possible method, the removal of the foreign material F.

Figure 6:
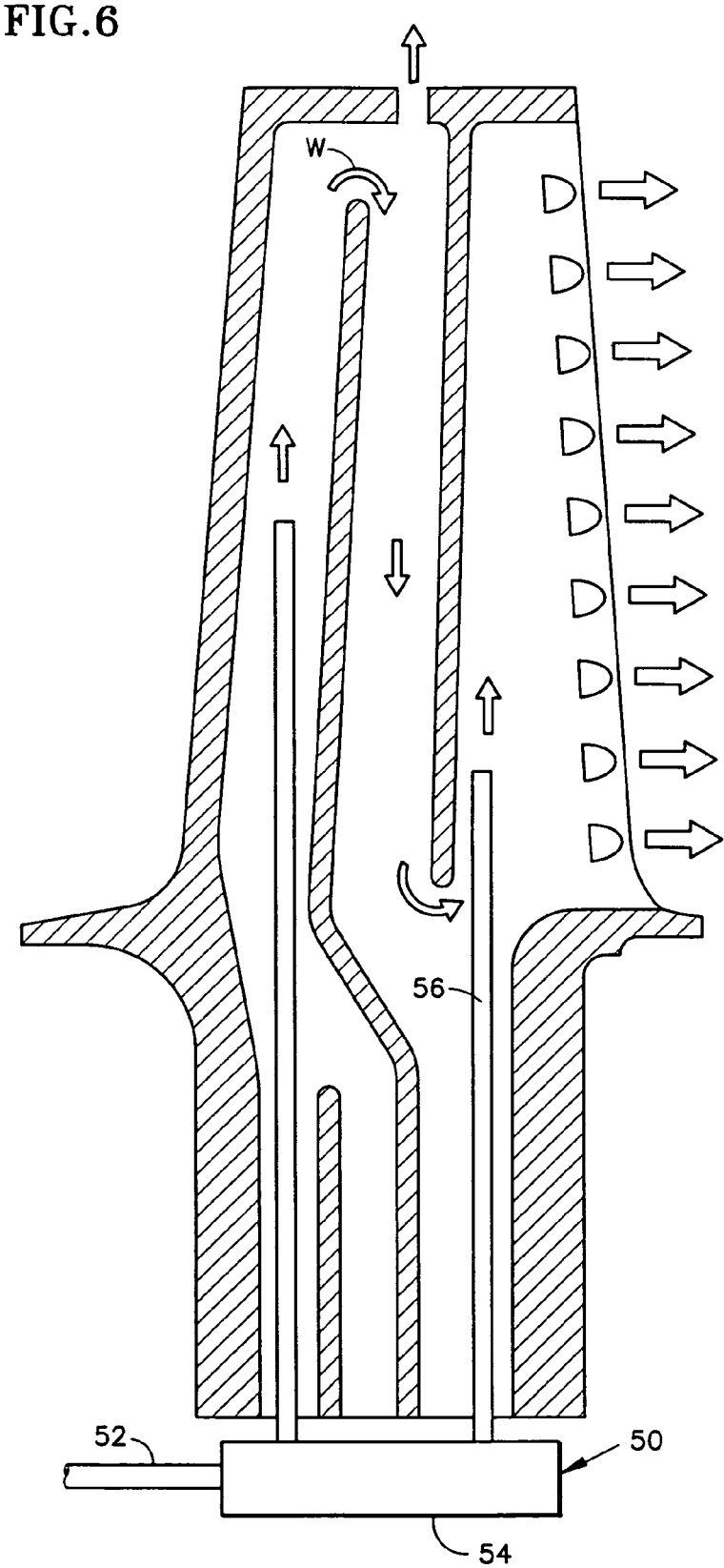
FIG. 6 is the turbine blade of FIG. 3 during another step of one possible method of removing the foreign material.

FIG. 6 shows another step in a possible method of removing the foreign material F. The figure displays a cleaning device for the cavity 36, such as a high-pressure washer 50. The washer includes a fluid source 52, a manifold 54 for receiving fluid W from the fluid source 52 and one or more probes 56 for discharging the fluid into the cavity 36. The shape of the serpentine passageway 46 can determine the length and positioning of the probes 56 within the cavity 36. As an example, the location of the probes 56 helps direct the fluid through the serpentine passageway 46 and out of the cavity 36. While water appears the most economical and environmentally friendly choice to flush out the foreign material F, the washer 50 could operate with other fluids, or even with water having additives therein.

The washer 50 could operate, for example, at pressures of between approximately 1000 and 20,000 psi. In addition, the washer 50 could have an automatic wash cycle or the technician could manually operate the washer 50. As an example, the washer 50 could be a HDP52 Power Flush unit available from Hammelmann Corporation of Dayton, Ohio.

Although shown in FIG. 6 as entering the cavity 36 through the inlets 38, the probes 56 could enter the cavity 36 through any suitable opening. In other words, the probes 56 could enter the cavity 36 through the outlets 40 or the additional opening 48. That allows the additional opening 48 to either serve as an entrance for the fluid into the cavity 36 or, as seen in FIG. 6, as an exit for the fluid W from the cavity 36. The technician may need to repeat the aforementioned method any number of times to remove the foreign material F entirely.

Rather than using the washer 50, the present invention could use alternate steps to dislodge the foreign material F. As one example, a technician could use an implement, such as a pick, to enter the cavity 36 and to physically contact the foreign material F. The technician could insert the implement through the additional opening 48, although the other openings are also available. Entering the cavity 36 through the additional opening 48 may require the additional opening 48 to have a different location or shape than that described above. For example, the additional opening could be directed towards the foreign material F to assist insertion of the implement.

After dislodging the foreign material, another step in a possible method is to close the additional opening 48. The technician could use any suitable technique to close the additional opening 48. Depending on the material used for the turbine blade 22, suitable techniques include, for example, weld build-up, a weld plug, transient liquid phase bonding and brazing a filler material therein.

Figure 7:
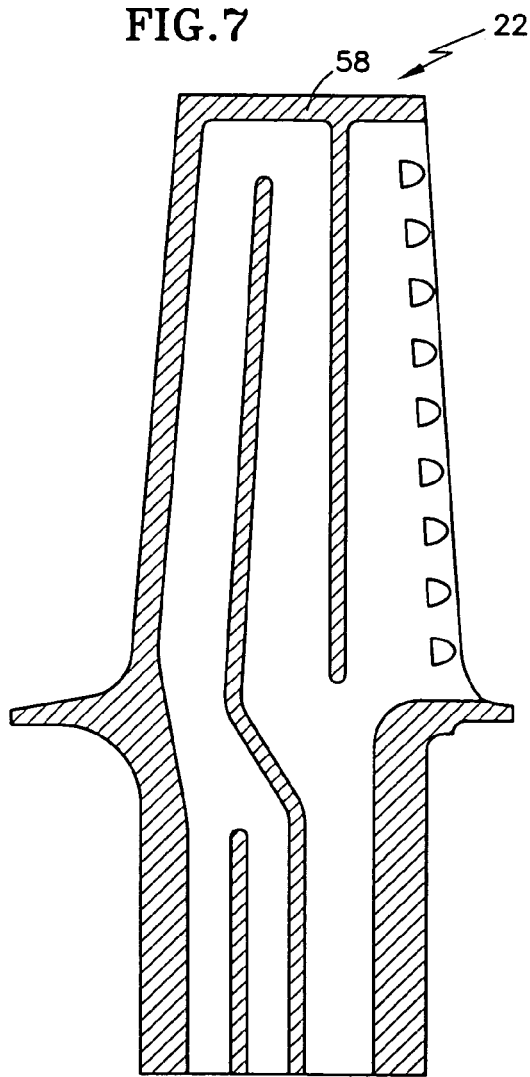
FIG. 7 is the turbine blade of FIG. 3 after being refurbished by one possible method of removing the foreign material.

FIG. 7 displays the turbine blade 22 after closing the additional opening 48. The turbine blade 22 now has a repaired section 58 that was once the additional opening 48. In other words, the additional opening was a temporary feature on the turbine blade 22. Preferably, the repaired turbine blade 22 mirrors the turbine blade before the repair, except for the foreign material F. The present invention allows for the salvage of turbine blades 22 that, due to the presence of the foreign material F in the cavity 36, would typically require scrapping.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A method of removing foreign material from a cavity, comprising the steps of:
   providing a part with an internal cavity, at least one opening in communication with said cavity, and foreign material within said cavity;
   locating said foreign material within said cavity;
   creating an additional opening in said part at a location adjacent said located foreign material;
   removing said foreign material from said cavity; and
   closing said additional opening.

2. The method of claim 1, wherein said locating step comprises visual recognition.

3. The method of claim 1, wherein said cavity has a passageway from an inlet to an outlet, and said location of said additional opening is downstream of said foreign material.

4. The method of claim 1, wherein said part is a blade or vane.

5. The method of claim 1, wherein said locating step comprises utilizing at least one of: x-ray; neutron radiography; ultrasound and thermal imaging.

6. The method of claim 1, wherein said creating step comprises utilizing at least one of: a router, a milling machine, an electrical discharge machine, and a laser drilling machine.

7. The method of claim 1, wherein said removing step comprises at least one of: flushing said cavity with a fluid; and utilizing an implement to physically dislodge the foreign material.

8. The method of claim 1, wherein said closing step comprises at least one of: weld build-up, weld plug, transient liquid phase bonding, and brazing a filler material therein.

9. A method of removing foreign material from a cavity comprising the steps of:
   providing a part with an internal cavity, at least one opening in communication with said cavity, and foreign material within said cavity;
   locating said foreign material within said cavity;
   creating an additional opening in said part at a location proximate said located foreign material;
   flushing said cavity with a fluid; and
   closing said additional opening, wherein said additional opening acts as an exit for said fluid and said foreign material.

10. The method of claim 9, wherein said cavity has a passageway from an inlet to an outlet, and said additional opening is located downstream of said foreign material.

11. The method of claim 9, wherein said flushing step comprises high pressure cleaning.

12. The method of claim 9, wherein said part is a blade or vane.

13. The method of claim 9, wherein said locating step comprises utilizing at least one of: x-ray; neutron radiography, ultrasound; and thermal imaging.

14. The method of claim 9, wherein said creating step comprises utilizing at least one of a router, a milling machine, an electrical discharge machine, and a laser drilling machine.

15. The method of claim 9, wherein said closing step comprises at least one of: weld build-up, weld plug, transient liquid phase bonding, and brazing a filler material therein.

16. A method of removing foreign material from a cavity comprising the steps of:
   providing a part with an internal cavity, at least one opening in communication with said cavity, and foreign material within said cavity;
   locating said foreign material within said cavity via at least one of:
   x-ray;
   neutron radiography;
   ultrasound; and
   thermal imaging;
   creating an additional opening in said part; and
   removing said foreign material through said additional opening; and closing said additional opening.

17. The method of claim 16, wherein said removing step comprises flushing said cavity with a fluid.

18. The method of claim 17, wherein said flushing step comprises high pressure cleaning.

19. The method of claim 16, wherein said creating step positions said additional opening adjacent said located foreign material.

20. The method of claim 19, wherein said creating step positions said additional opening downstream of said foreign material.

21. The method of claim 16, wherein said part is a blade or vane.

22. The method of claim 16, wherein said creating step comprises utilizing at least one of: a router, a milling machine, an electrical discharge machine, and a laser drilling machine.

23. The method of claim 16, wherein said closing step comprises at least one of: weld build-up, weld plug, transient liquid phase bonding, and brazing a filler material therein.

* * * * *